US008715515B2

(12) United States Patent
Nguyen et al.

(10) Patent No.: US 8,715,515 B2
(45) Date of Patent: May 6, 2014

(54) PROCESS FOR OPTIMIZATION OF ISLAND TO TRENCH RATIO IN PATTERNED MEDIA

(75) Inventors: Houng T. Nguyen, San Ramon, CA (US); Ren Xu, San Jose, CA (US); Michael S. Barnes, San Ramon, CA (US)

(73) Assignee: Intevac, Inc., Santa Clara, CA (US)

( * ) Notice: Subject to any disclaimer, the term of this patent is extended or adjusted under 35 U.S.C. 154(b) by 734 days.

(21) Appl. No.: 12/730,147

(22) Filed: Mar. 23, 2010

(65) Prior Publication Data

US 2010/0237042 A1    Sep. 23, 2010

Related U.S. Application Data

(60) Provisional application No. 61/612,647, filed on Mar. 23, 2009.

(51) Int. Cl.
*B44C 1/22* (2006.01)

(52) U.S. Cl.
USPC .................... 216/22; 216/67; 216/71; 216/72

(58) Field of Classification Search
CPC ................................ G11B 5/484; B44C 1/227
USPC ......................................... 216/22, 67, 71, 72
See application file for complete search history.

(56) References Cited

U.S. PATENT DOCUMENTS

| | | | |
|---|---|---|---|
| 6,805,054 B1 | 10/2004 | Meissl et al. | |
| 6,871,558 B2 | 3/2005 | Choi et al. | |
| 6,900,881 B2 | 5/2005 | Sreenivasan et al. | |
| 6,908,861 B2 | 6/2005 | Sreenivasan et al. | |
| 6,916,584 B2 | 7/2005 | Sreenivasan et al. | |
| 6,926,929 B2 | 8/2005 | Watts et al. | |
| 6,929,762 B2 | 8/2005 | Rubin | |
| 6,932,934 B2 | 8/2005 | Choi et al. | |
| 6,936,194 B2 | 8/2005 | Watts | |
| 6,946,360 B2 | 9/2005 | Chou | |
| 6,951,173 B1 | 10/2005 | Meissl et al. | |
| 6,980,282 B2 | 12/2005 | Choi et al. | |
| 6,982,783 B2 | 1/2006 | Choi et al. | |
| 6,990,870 B2 | 1/2006 | Choi et al. | |
| 7,019,819 B2 | 3/2006 | Choi et al. | |

(Continued)

OTHER PUBLICATIONS

International Search Report in International Application No. PCT/US10/28366, dated May 7, 2010.

(Continued)

*Primary Examiner* — Binh X Tran
(74) *Attorney, Agent, or Firm* — Nixon Peabody LLP; Joseph Bach, Esq.

(57) ABSTRACT

A sequence of process steps having balanced process times are implemented in sequence of etch chambers coupled linearly and isolated one from the other, resulting in the optimization of island to trench ratio for a patterned media. A biased chemical etching using active etching gas is used to descum and trim the resist patterns. An inert gas sputter etch is performed on the magnetic layers, resulting in the patterned magnetic layer on the disk. A final step of stripping is then performed to remove the residual capping resist and carbon hard mask on top of un-etched magnetic islands. The effective magnetic material remaining on the disk surface can be optimized by adjusting the conditions of chemical etch and sputter etch conditions. Relevant process conditions that may be adjusted include: pressure, bias, time, and the type of gas in each step.

26 Claims, 3 Drawing Sheets

(56) References Cited

U.S. PATENT DOCUMENTS

| | | |
|---|---|---|
| 7,019,835 B2 | 3/2006 | McMackin et al. |
| 7,027,156 B2 | 4/2006 | Watts et al. |
| 7,036,389 B2 | 5/2006 | Choi et al. |
| 7,037,639 B2 | 5/2006 | Voisin |
| 7,041,604 B2 | 5/2006 | Miller et al. |
| 7,070,405 B2 | 7/2006 | Sreenivasan et al. |
| 7,071,088 B2 | 7/2006 | Watts et al. |
| 7,077,992 B2 | 7/2006 | Sreenivasan et al. |
| 7,090,716 B2 | 8/2006 | McMackin et al. |
| 7,105,452 B2 | 9/2006 | Sreenivasan |
| 7,122,079 B2 | 10/2006 | Xu et al. |
| 7,122,482 B2 | 10/2006 | Xu et al. |
| 7,132,225 B2 | 11/2006 | Voisin |
| 7,136,150 B2 | 11/2006 | Sreenivasan et al. |
| 7,140,861 B2 | 11/2006 | Watts et al. |
| 7,150,622 B2 | 12/2006 | Choi et al. |
| 7,157,036 B2 | 1/2007 | Choi et al. |
| 7,170,589 B2 | 1/2007 | Cherala et al. |
| 7,179,079 B2 | 2/2007 | Sreenivasan et al. |
| 7,179,396 B2 | 2/2007 | Sreenivasan |
| 7,186,656 B2 | 3/2007 | Sreenivasan |
| 7,205,244 B2 | 4/2007 | Stacey et al. |
| 7,224,443 B2 | 5/2007 | Choi et al. |
| 7,241,395 B2 | 7/2007 | Sreenivasan et al. |
| 7,244,386 B2 | 7/2007 | Sreenivasan et al. |
| 7,252,715 B2 | 8/2007 | Watts et al. |
| 7,252,777 B2 | 8/2007 | Vidusek et al. |
| 7,256,131 B2 | 8/2007 | LaBrake |
| 7,259,102 B2 | 8/2007 | Wang et al. |
| 7,261,830 B2 | 8/2007 | Cherala et al. |
| 7,261,831 B2 | 8/2007 | Sreenivasan |
| 7,270,533 B2 | 9/2007 | McMackin et al. |
| 7,279,113 B2 | 10/2007 | Watts et al. |
| 7,281,919 B2 | 10/2007 | Shackleton et al. |
| 7,281,921 B2 | 10/2007 | Watts et al. |
| 7,282,550 B2 | 10/2007 | Xu et al. |
| 7,292,326 B2 | 11/2007 | Nimmakayala et al. |
| 7,298,456 B2 | 11/2007 | Cherala et al. |
| 7,307,118 B2 | 12/2007 | Xu et al. |
| 7,309,225 B2 | 12/2007 | McMackin et al. |
| 7,316,554 B2 | 1/2008 | Choi et al. |
| 7,322,287 B2 | 1/2008 | Tan et al. |
| 7,323,130 B2 | 1/2008 | Nimmakayala et al. |
| 7,323,417 B2 | 1/2008 | Sreenivasan |
| 7,338,275 B2 | 3/2008 | Choi et al. |
| 7,357,876 B2 | 4/2008 | Sreenivasan |
| 7,387,508 B2 | 6/2008 | Choi et al. |
| 7,396,475 B2 | 7/2008 | Sreenivasan |
| 7,420,654 B2 | 9/2008 | Cherala et al. |
| 7,442,336 B2 | 10/2008 | Choi et al. |
| 7,452,574 B2 | 11/2008 | Truskett et al. |
| 7,462,028 B2 | 12/2008 | Cherala et al. |
| 7,473,090 B2 | 1/2009 | McMackin et al. |
| 7,491,637 B2 | 2/2009 | Sreenivasan et al. |
| 7,531,025 B2 | 5/2009 | McMackin et al. |
| 7,547,398 B2 | 6/2009 | Schmid et al. |
| 7,547,504 B2 | 6/2009 | Sreenivasan |
| 7,630,067 B2 | 12/2009 | Nimmakayala et al. |
| 7,635,263 B2 | 12/2009 | Cherala et al. |
| 7,635,445 B2 | 12/2009 | Choi et al. |
| 7,636,999 B2 | 12/2009 | Choi et al. |
| 7,641,840 B2 | 1/2010 | Choi et al. |
| 7,665,981 B2 | 2/2010 | Schumaker et al. |
| 7,670,529 B2 | 3/2010 | Choi et al. |
| 7,670,530 B2 | 3/2010 | Choi et al. |
| 7,670,534 B2 | 3/2010 | Choi et al. |
| 7,670,953 B2 | 3/2010 | Sreenivasan |
| 7,691,313 B2 | 4/2010 | Choi et al. |
| 7,699,598 B2 | 4/2010 | Sreenivasan et al. |
| 7,708,926 B2 | 5/2010 | Choi et al. |
| 7,717,696 B2 | 5/2010 | Chou et al. |
| 7,727,453 B2 | 6/2010 | Sreenivasan et al. |
| 7,759,407 B2 | 7/2010 | Xu |
| 7,768,624 B2 | 8/2010 | Cherala et al. |
| 7,780,893 B2 | 8/2010 | Sreenivasan et al. |
| 7,785,096 B2 | 8/2010 | Nimmakayala et al. |
| 7,785,526 B2 | 8/2010 | Voisin |
| 7,795,132 B2 | 9/2010 | Sreenivasan et al. |
| 7,798,801 B2 | 9/2010 | Babbs et al. |
| 7,802,978 B2 | 9/2010 | Sreenivasan et al. |
| 7,803,308 B2 | 9/2010 | GanapathiSubramanian et al. |
| 7,811,505 B2 | 10/2010 | McMackin et al. |
| 7,815,824 B2 | 10/2010 | Sreenivasan et al. |
| 7,837,907 B2 | 11/2010 | Nimmakayala et al. |
| 7,837,921 B2 | 11/2010 | Xu et al. |
| 7,845,931 B2 | 12/2010 | Xu et al. |
| 7,854,867 B2 | 12/2010 | Schumaker |
| 7,858,528 B2 | 12/2010 | Sreenivasan |
| 7,874,831 B2 | 1/2011 | Resnick et al. |
| 7,880,872 B2 | 2/2011 | Nimmakayala et al. |
| 2002/0139775 A1* | 10/2002 | Chang et al. .............. 216/67 |
| 2007/0031609 A1* | 2/2007 | Kumar et al. .............. 427/569 |
| 2007/0119373 A1 | 5/2007 | Kumar et al. |
| 2007/0207263 A1* | 9/2007 | Hieda et al. .............. 427/127 |
| 2010/0244324 A1 | 9/2010 | Zhang et al. |
| 2010/0247698 A1 | 9/2010 | Zhang et al. |

OTHER PUBLICATIONS

Glinsner, T. et al., "Nanoimprint Lithography—The Technology Makes its Mark on CMOS Image Sensors and in the Nano-World," Optik & Photonik, No. 2, Jun. 2010, Wiley-VCH Verlag GmbH & Co. KGaA, Weinheim, pp. 42-45.

Moreno, W. et al., "Sub-100nm Alignment for Nanoimprint Lithography," Keimel Nanostructure Laboratory Department of Electrical Engineering Princeton University Aug. 6, 2002.

* cited by examiner

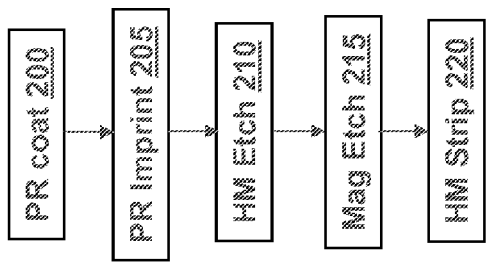
Figure 2
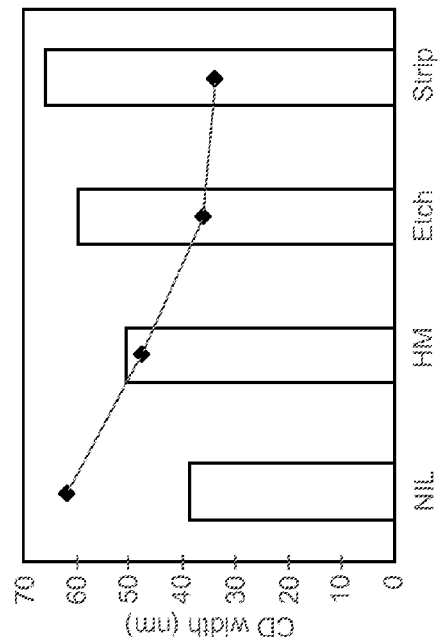
Figure 3
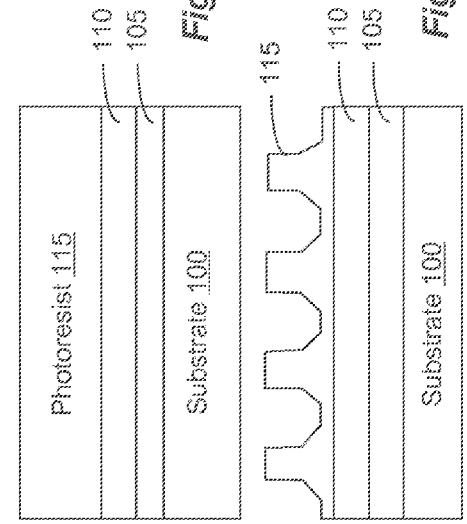
Figure 1A
Figure 1B
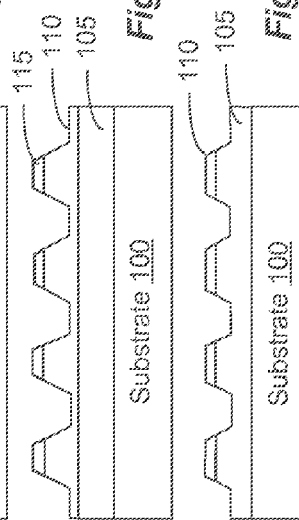
Figure 1C
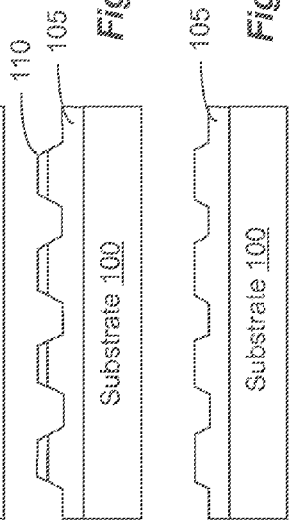
Figure 1D
Figure 1E

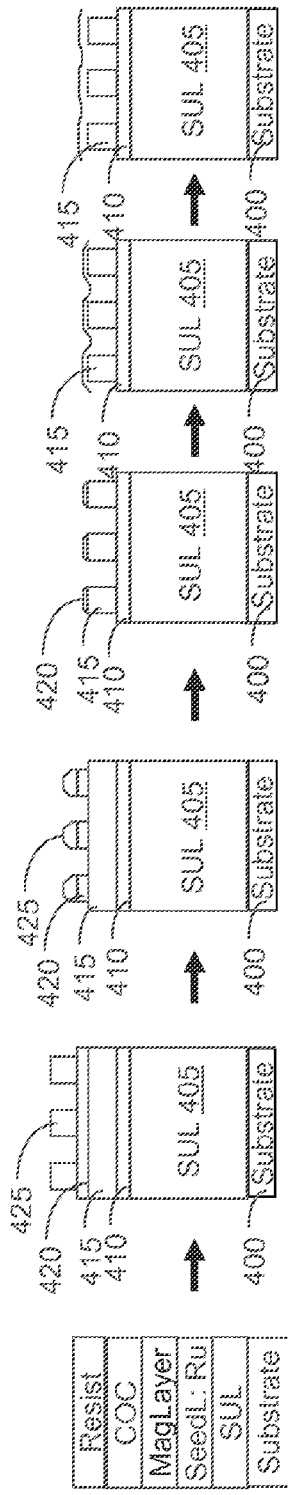
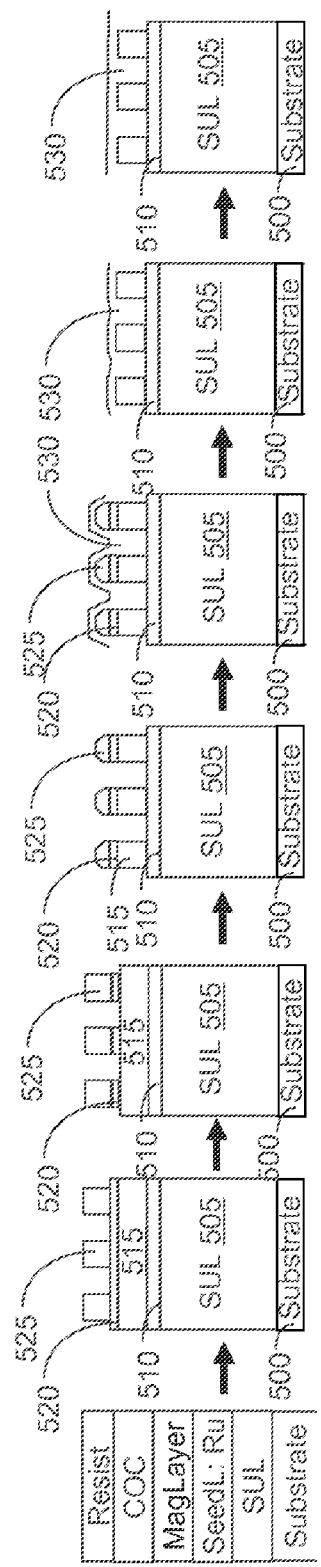

| 1 | 2 | 3 | 4 | 5 | 6 | 7 | 8 |
|---|---|---|---|---|---|---|---|
| De-scum Trim | C-HM Etch Side I | C-HM Etch Side II | Mag Layer Etch Side I | Cooling | Mag Layer Etch Side I | Cooling | Mag Layer Etch Side II |
| RF | Soft Etch | Soft Etch | Sputter Etch | DCS: Dynamic Cooling | Sputter Etch | DCS: Dynamic Cooling | Sputter Etch |

| 16 | 15 | 14 | 13 | 12 | 11 | 10 | 9 |
|---|---|---|---|---|---|---|---|
| Flash Carbon | DLC | Cooling | C/M (or SiO2) Etch | C or M Refill (or SiO2) | C/M (or SiO2) Etch | C or M Refill (or SiO2) | Mag Layer Etch Side II |
| URMA | NCT | DCS: Dynamic Cooling | Soft Etch (or Sp Etch) | URMA (or RF) | Soft Etch (or Sp Ech) | URMA (or RF) | Sputter Etch |

*Figure 6*

PROCESS FOR OPTIMIZATION OF ISLAND TO TRENCH RATIO IN PATTERNED MEDIA

RELATED CASES

This application claims priority from U.S. Provisional patent application Ser. No. 61/162,647, Filed Mar. 23, 2009.

BACKGROUND

1. Field

This invention relates to the art of substrates micro-fabrication and, more particularly, to patterning of substrates, e.g., the magnetic layers of a hard disk for hard disk drives.

2. Related Art

Micro-fabrication of substrates is a well know art employed in, for example, fabrication of semiconductors, flat panel displays, light emitting diodes (LED's), hard disks for hard disk drives (HDD), etc. As is well known, fabrication of semiconductors, flat panel displays and LED's involves various steps for patterning the substrate. On the other hand, traditional fabrication of hard disks, generally referred to as longitudinal recording technology, does not involve patterning. Similarly, fabrication of disks for perpendicular recording technology does not involve patterning. Rather uniform layers are deposited and memory cells are generally defined by the alternating change of magnetic flux induced by the recording head, with each recording bit encompassing multiple grains within the un-patterned magnetic layers.

It has been demonstrated that non-patterned disks would fail to satisfy the needs of the market, in terms of area bit density and costs, in order to remain competitive with other forms of storage. Consequently, it has been proposed that next generation disks should be patterned. It is envisioned that the patterning process may utilize photolithography, although currently there is no certainty which lithography technology may be commercialized, and no commercial system is yet available for commercial manufacturing of patterned media. Among contenders for photolithography are interference photolithography, near field lithography and nano-imprint lithography (NIL). Regardless of the lithography technology utilized, once the photoresist is exposed and developed, the disk needs to be etched and fabricated according to the desired pattern. However, although much development efforts have been focused on the patterning step, many obstacles still exist for fabricating a patterned disk in a commercially viable environment.

To be sure, etch, sputtering, and other fabrication technologies are well known and well developed for semiconductor, flat panel display, LED's, etc. However, these technologies need to be integrated together with viable processes to enable commercial fabrication of patterned disks for HDD. Moreover, unlike HDD disks, in all of the other applications only one side of the substrate needs to be etched—allowing a chuck to hold the substrate from the backside during fabrication. On the other hand, HDD disks need to be fabricated on both sides, preventing the use of a chuck. Indeed, in HDD disk fabrication, no part of the fabrication system may contact any surface of the disk. Also, while HDD manufacturers expect the system to have a throughput on the order of 1000 disks per hour, fabricators of semiconductors employ systems having throughputs of only tens of substrates per hour.

Prior art patterning typically consists of steps that are broken down to the processing and/or etching of each layer individually. Typical process sequence include: descum, carbon hard mask opening by ion milling, followed by etching the magnetic layer by ion milling, and followed by mask removal. The above approach, while effective in forming the final etched magnetic feature, is very cumbersome and slow. Typical process time for each step can be a few minutes up to a few tens of minutes, thus rendering these approaches (broken steps with ion milling) impractical for rapid commercial production. The important duty cycle which is critical to the ultimate purpose of the patterned media is not addressed.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

According to aspects of the invention, a method and system for fabricating patterned media is disclosed, including hardware to produce the structure for patterned media, which include a carbon hard mask as part of the lithographic process for forming a bit patterned media (BPM) or discrete track recording (DTR) disks for hard disk drives (HDD).

According to further aspects of the invention, a sequence of process steps are implemented in a sequence of etch chambers, that results in the optimization of island to trench ratio for a patterned media in HDD. The various etch and fill steps are partitioned into processes performed in successive serial chambers that, together with balancing of the process times in each chamber, enable high volume manufacturing at high throughput. After the initial imprinting of a photo-resist on the top surface of a continuous carbon hard mask, a biased chemical etching using active etching gas is used to descum and trim the resist patterns. At the completion of the descum/hard mask opening step, an inert gas sputter etch is performed on the magnetic layers, resulting in the patterned magnetic layer on the disk. A final step of stripping is then performed to remove the residual capping resist and carbon hard mask on top of un-etched magnetic islands. The effective magnetic material remaining on the disk surface can be optimized by adjusting the conditions of chemical etch and sputter etch conditions. Relevant process conditions that may be adjusted include: pressure, bias, time, and the type of gas in each step. According to one embodiment, a fluorine-containing gas, such as CF4, or a gas having the general formula $CH(x)F(4-x)$, encompassing CHF3, CH2F2, CH3F, etc., wherein x is an integer, is used during chemical etch and descumming, and an Ar sputter etch is used during magnetic layer etch. According to some embodiments, a reactive gas is also flowed into the chamber during the sputter etch step.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIGS. 1A-1E illustrate a cross-section of a media being patterned according to embodiments of the invention.

FIG. 2 illustrates a process flow corresponding to the step shown in FIGS. 1A-1E.

FIG. 3 is a plot showing the results of the process of FIG. 2, wherein the critical dimension (CD) of the tracks is shown by the bars and the CD of the grooves is shown by the linked data points.

FIGS. 4A-4F illustrate a process according to an embodiment of the invention for producing patterned media.

FIGS. 5A-5G illustrate another process according to an embodiment of the invention for producing patterned media.

FIG. 6 illustrates an example of a patterning system according to an embodiment of the invention, wherein the etch and refill steps are spread among several chambers arranged linearly.

DETAILED DESCRIPTION

The HDD industry's move to patterned media is driven largely by the need for higher bit density. Using patterned media, individual "islands" of magnetic material can be created at various densities, higher than possible without patterning. The effective magnetic material remaining on the disk surface, i.e., the "islands" which contribute positively to the signal-to-noise ratio of magnetic recording, is also referred to as "duty cycle" of patterned media. In order to increase the density of the media, the duty cycle needs to be increased.

Various embodiments of the invention provide sequences of processes implemented in etch chambers, that result in the optimization of island to trench ratio for a patterned media in HDD. In general, the starting material for this process is an HDD media, which is a substrate (aluminum or glass) that is covered with a continuous magnetic film and a masking of a continuous carbon hard mask with photoresist mask on top. After the initial imprinting of the photo-resist, a biased chemical etching step using a chemically reactive gas, e.g., a fluorine-containing gas such as CF4, or a gas having the general formula CH(x)F(4−x), encompassing CHF3, CH2F2, CH3F, etc., is used to descum and trim the resist patterns. At the completion of the descum/hard mask opening step, a sputter etch step is performed using an inert gas, e.g., Ar, on the magnetic layers, resulting in the patterned magnetic layer on the disk. A final step of stripping is then performed to remove the residual capping resist and carbon hard mask on top of un-etched magnetic islands.

The duty cycle of the patterned media can be optimized by adjusting the conditions of the chemical etch and the sputter etch conditions. Relevant process conditions that may be adjusted include: chamber pressure, bias, etch time, and the type of gas in each step. According to one effective embodiment, the reactive etching gas is CF4 or CHF3 and the inert gas is Ar, used for sputter-etching the magnetic layer.

The above procedure, when applied to the etching of a disk with full stack of magnetic material, such as that used in a hard disk drive, would result in a practical approach to fabricating patterned magnetic media with maximized magnetic island-to-trench ratio in bit-patterned-media (BPM), or maximized magnetic ridge-to-trench ratio in discrete-track-recording (DTR). The practical benefit of the maximized ratio is in the final signal-to-noise performance in the hard disk drive.

Embodiments of the present invention solve the shortcomings of the prior art by, among others:

(1) Using a biased directional chemical etch step to descum imprinted photoresist and to open carbon hard mask to complete image transfer;

(2) Under optimized conditions, the critical dimension of the trenches can be reduced, hence increase the duty cycle of the imprinted features;

(3) The critical dimension maybe adjusted to maintain what was accomplished in CF4 or CHxF(4−x) chemical etching; namely, the effective increase of island or ridge to trench area ratio; and, (4) When combined and properly optimized, the chemical etch step and the sputter etch step can be formulated to produce a patterned media of desired duty cycle, which produces finished disks of desired signal to noise characteristics.

FIGS. 1A-1E illustrate a cross-section of a media being patterned according to embodiments of the invention, while FIG. 2 illustrates a process flow corresponding to the step shown in FIGS. 1A-1E. FIG. 1A illustrates the starting stack, which includes substrate 100, a magnetic stack 105, a hard mask 110, and a photoresist mask 115. The photoresist coating is performed in step 200 of FIG. 2, using any conventional photoresist. Then in step 205 the pattern is imprinted on the photoresist. In this particular example a nano-imprint lithography (NIL) is used, but other techniques, such as optical exposure and development can be used. The result of the NIL of step 205 is shown in FIG. 1B, wherein the photoresist 115 is patterned. In this particular example, the NIL design results in duty cycle of about 40%.

The substrate is then transferred into an etch chamber and the imprint on the photoresist is transferred to the hard mask 110 using biased chemical etch in step 210. This is shown in FIG. 1C, wherein the hard mask 110 is etched, while part of the photoresist is still shown remaining on top of the hard mask "islands." Since the etch that transfers the pattern onto the hard mask proceeds at an angle in each "valley," the duty cycle after the hard mask etch now becomes about 50%. In step 215 the pattern is transferred from the hard mask to the magnetic stack using ion milling etch. The result is shown in FIG. 1D, which now has a duty cycle of about 60%. At step 220 the remaining hard mask is striped using chemical etch. The result is shown in FIG. 1E, which still maintains duty ratio of about 60%.

Thus, as can be seen, embodiments of the invention can improve the duty cycle. Consequently, the specifications on the pattern imprint can be relaxed, or tight specifications can be used to thereby achieve very high density media. This is shown in FIG. 3, wherein the critical dimension (CD) of the tracks is shown by the bars and the CD of the grooves is shown by the linked data points. As can be seen, the process leads to increase in track CD and decrease in groove CD, thereby increasing the duty cycle.

According to an embodiment of the invention, the hard mask etch of step 210 is divided into descum and hard mask etch. The descum is performed by chemical etching using a capacitively coupled (CCP) plasma striking on the imprinted disk surface under bias-conditions to accomplish "descum" action, thus clearing the bottom imprinted trenches of residual resists from the NIL, to thereby expose the top surface of the hard mask. Then the same chemical etching in the same process step is performed using the same coupled (CCP) plasma striking on the imprinted disk surface under bias-conditions to etch the carbon hardmask through the imprinted resists. Thus the complete image is transferred to the carbon hardmask. The reactive gas used in these steps may be a fluorine-containing gas, such as CF4, or a gas having the general formula CH(x)F(4−x), encompassing CHF3, CH2F2, CH3F, etc.

According to an embodiment of the invention, the magnetic stack etch of step 215 is performed using sputter etch. The sputter etch is done using a CCP Ar plasma striking on the carbon hard-masked disk surface under bias-conditions to accomplish metal layer etching, thus forming the "islands" or "ridges" of magnetic material among "trenches" formed by removal of magnetic material by the sputter action of Ar plasma. The mask stripping process of step 220 is performed using a CCP O2 plasma to remove residual carbon hardmask and resist (if any) layers on top of the metal "islands" and "ridges". The critical dimensions resulting from these processes provide the final "island-to-trench-ratio" that is critical to the overall utilization of the metal material.

As explained above during the plasma assisted chemical etching step, when properly conducted, the trench area may shrink, while the island area may expand. Due primarily to the combined effect of the chemical reaction and the directionality of ionic species under bias, the degree of "anisotropic" etching can be adjusted by the etch conditions, which effectively increases the island or ridge image, which subsequently increase the useful mass of the metal material on the disk surface at the completion of the metal etching step. The subsequent step of metal etching is performed by a biased Ar sputter. The critical dimension of this step may be adjusted to maintain what was accomplished in the reactive gas chemical etching: namely the effective increase of island or ridge to trench area ratio. A fully optimized process consisting of the CF4, CHF3, etc., chemical etching to accomplish imprinted feature trimming/descumming/carbon hard mask opening, and followed with the CCP Ar sputter etch of the metal material through imprinted photoresist/carbon hardmask allows for the maximization of metal island/ridge to trench ratio in the final etched product.

FIGS. 4A-4F illustrate a process according to an embodiment of the invention for producing patterned media. FIG. 4A shows a cross section of the structure, starting with the substrate 400, a soft under layer (SUL) 405, a seed layer 410, magnetic stack 415, hard mask (e.g., diamond type carbon, generally referred to as carbon overcoat or COC) 420, and photoresist 425. In FIG. 4A these layers are shown as each having the same thickness, but in actual devices the thickness of each layer is different, as shown in more relative perspective in FIGS. 4B-4F.

In FIG. 4B, the disk has been processed to transfer the pattern onto the photoresist. As noted, this can be done by, e.g., NIL process. Once the pattern has been transferred to the disk, in FIG. 4C the disk is moved into a vacuum environment to perform the following steps—without taking the disk out of a vacuum environment. This can be done in a system similar to the 200 Lean® available from Intevac of Santa Clara, Calif. The disk is placed on an etch chamber and a biased chemical etch is used to descum the photoresist so as to expose the hard mask, and then to transfer the pattern design from the photoresist to the hard mask. In FIG. 4D the disk is etched using sputtering etch process so as to transfer the pattern from the hard mask to the magnetic stack. According to embodiments of the invention, the etch is performed in a capacitively coupled etch chamber having RF frequency of 13.56 MHz at power of 100-3000 W. The chamber is maintained at pressure of 10-80 mT using Ar as the process gas. This results in an etch rate of more than 1 nm/Sec. The disk is then cleaned in a chemical etch process using, e.g., oxygen gas, to remove any mask residue (not shown), and is then transferred to a deposition chamber and diamond-type carbon is deposited so as to overfill the grooves. The carbon is then etched back to planarize the surface of the disk. Then, at FIG. 4F, a thin protective coat of diamond-like carbon layer (generally referred to as NCT carbon) is formed to further planarize and protect the top surface of the disk. Other films that may be used for planarizing are SiN and SiO2.

FIGS. 5A-5G illustrate another process according to an embodiment of the invention for producing patterned media. FIG. 5A illustrate the starting media, similar to that shown in FIG. 4A, starting with the substrate 500, a soft under layer (SUL) 505, a seed layer 510, magnetic stack 515, hard mask (e.g., diamond type carbon, generally referred to as carbon overcoat or COC) 520, and photoresist 525. In FIG. 5A these layers are shown as each having the same thickness, but in actual devices the thickness of each layer is different, as shown in more relative perspective in FIGS. 5B-5G.

In FIG. 5B, the disk has been processed to transfer the pattern onto the photoresist. As noted, this can be done by, e.g., NIL process. Once the pattern has been transferred to the disk, in FIG. 5C the disk is moved into an etch chamber in the processing system, and a biased chemical etch is used to descum the photoresist 525 so as to expose the hard mask (sometimes the NIL process results in "left over" photoresist that needs to be removed before the pattern is transferred to the hard mask), and then to transfer the pattern design from the photoresist to the hard mask 520. In FIG. 5D the disk is etched using sputtering etch process so as to transfer the pattern from the hard mask to the magnetic stack 515. According to embodiments of the invention, the etch is performed in a capacitively coupled etch chamber having RF frequency of 13.56 MHz at power of 100-3000 W. The chamber is maintained at pressure of 10-80 mT using Ar as the process gas. This results in an etch rate of more than 1 nm/Sec. The disk is then transferred to a deposition chamber and in step 5E diamond-type carbon is deposited so as to overfill the grooves, including covering the remaining photoresist and hard mask. The carbon is then etched back in step 5F to planarize the surface of the disk. Then, at step 5G, a thin protective coat of diamond-like carbon layer (generally referred to as NCT carbon) is formed to further planarize and protect the top surface of the disk.

FIG. 6 illustrates an example of a patterning system that can be used to process patterned media according to an embodiment of the invention. The general structure of the system may mimic that of the 200Lean® available from Intevac, of Santa Clara, Calif. Using such a system, the various etch and fill steps may be partitioned into processes that are performed in successive serial chambers. Using proper balancing of the process times in each chamber, high volume manufacturing at high throughput can be achieved.

In this example the system has two elevators, 602 and 604, and sixteen processing chambers, labeled 1-16. In the system, each chamber has a lower part that functions as transport chamber for transporting the carrier with the disk, shown generally as 606, and an upper processing chamber for performing the process on the disk. While some chambers process both sides of the disk simultaneously, others process only one side, and so are provided in pairs to complete processing on both sides of the disk. In this system, once the disk enters the system it is maintained in vacuum environment until processing is completed and the disk exits the system.

In the example of FIG. 6, chamber 1 is a de-scum chamber, which may also be used for trimming the photoresist. Photoresist trimming can be used to modify the CD that resulted during the photoresist patterning step, e.g., the NIL step. This step is done using chemical etch by striking plasma using reactive precursor gas, such CF4. Note that when the process involved hard mask patterning, this step may be skipped, provided that the photo-resist is of a desired shape and gross dimension, as the hard mask patterning would remove any excess photoresist. This chamber processes both sides of the disk simultaneously.

Chambers 2 and 3 are utilized for carbon hard mask etch, i.e., for etching the COC layer. In the example of FIG. 6 the etch process may be done by soft etch using, e.g., biased RF source or remote plasma using, e.g., CF4 gas. In this example a biased RF plasma is used, so that each of chambers 2 and 3 etches one side of the disk. This can be accomplished with the close-proximity-bias backing plate mechanism used in the stations 4, 6, 8 and 9. If a non-biased plasma is used, e.g., remote plasma source, the process may be performed in a single chamber, etching both sides simultaneously. In general, for this step selectivity of the etch is the natural selectivity ratio that exist between photoresist and carbon, which can be between 1:1 to up to 1:10, depending on the carbon type and the resist type. Total etch thickness may be about 10-1000 Å, depending on the magnetic layer thickness and the etch selectivity.

Since in most applications the thickness of the photoresist would exceed that of the COC layer, it is likely that some photoresist would remain after completing the COC etch. Therefore, a step of reductive strip of resist may also be performed in chambers 2 and 3, or in subsequent chambers (not shown). This may be also performed using soft plasma using H2/O2 source gas. Since this process may also use oxygen, it is critical to avoid oxygen poisoning of the magnetic layer. This may be done by timely stopping flow of oxygen or by forming a passivation layer (e.g., Pt, Ta, Cr) over the magnetic layer before performing the strip resist step.

A chemical etching step can be performed, where anisotropy can be effectively tuned to achieve the above purposes, while accomplishing the image transfer to hard mask, and de-scum the imprinted photoresist, all in one action of a few seconds of process time. Such a step can be performed by striking plasma using reactive gas, such as CF4, and controlling the bias power so as to achieve the proper selectivity.

Chambers 4-9 are used to alternatingly etch the magnetic layer on one side of the disk and cool the disk after an etch process. In this example, no cooling chamber is provided between chambers 8 and 9, as in this example cooling between these two etch processes is done in elevator 604. Of course, if necessary, another cooling chamber may be added between these two chambers. In this example the magnetic layer is etched using ion sputtering etch with non-reactive gas, such as argon, which requires biasing the disk. Therefore, each chamber is structured to etch only one side of the disk. However, in alternative embodiment, in addition to the sputtering non-reactive gas, a reactive gas, such as CF4, or a gas having the general formula $CH(x)F(4-x)$, is also flowed into the chamber during sputter etch step.

The magnetic layer etch process should be designed so as to avoid puncturing the carbon hard mask, especially since sputtering etch is not very selective.

Therefore, the thickness of the hard mask should be designed such that at the end of the sputter etch, the CD of the pattern on the hard mask is still proper. Total etch depth of this step is about 100-1000 Å. It is desired to leave some thickness of the COC layer on top of the un-etched islands, which also helps preventing damage to the magnetic layer.

Argon sputter etch of magnetic material (mostly transition metal alloys) is a very efficient etch approach. Its characteristics include high material removal rate, compact hardware, ease of operation, and bias capable. Compared to other means of etching for transition metal alloys, the high material removal rate is accomplished through a combination of high plasma density, bias capability, and close proximity of plasma to the disk surfaces. Depending on the mask material and its selectivity against metal etch, this may result in a small degree of taper in the etched features, which, when controlled and used properly, can help gain magnetic ridge/island to trench ratio, thus help increasing the effective signal contributing magnetic mass while maintaining magnetic isolation between ridge/island by means of the trench.

Chamber 10 is used for forming a carbon refill layer to fill the etched regions. This may be done by sputtering carbon, e.g., NCT or sputtered carbon, filling with SiO2, or other materials. The thickness of the refill should be sufficient to allow follow-on planarization. In the example of FIG. 6 the refill is performed in two stages (chambers 10 and 12), with two follow-on planarization steps (chamber 11 and 13). Of course, depending on the refill material and technology used for the refill and planarization, other arrangements and different number of chambers may be utilized. Planarization may be done using etch back, e.g., using soft etch. The refill—etch back processing is followed with a cooling chamber 14. Chambers 15 and 16 are used to form a hard protective layer over the planarized refill. An additional benefit of the carbon refill is to effectively passivate the side-wall of the etched magnetic features.

This is critical for the magnetic integrity of the critical feature of a patterned media. The side-wall coverage and passivation of the patterned medial side-walls, can be accomplished by the NCT stations that are field-deployed in the HDD industry with zero-bias, effecting a chemical vapor deposition environment for isotropic carbon deposition and side-wall coverage and passivation as needed for the patterned media.

As described in the embodiments above, the sequential chemical etching and a sputter etch sequence produces a final etched magnetic feature for DTR and BPM purposes, in a process time of a few seconds. This process establishes a very efficient means of patterned media production. This level of efficiency and speed is industry leading by a large margin. The chemical etching, using CF4, is helpful to accomplish: descum, carbon hard mask opening (image transfer), and CD control, which leads to gain in the magnetic recording duty cycle. The sputter etch, using CCP source with Ar, is helpful to accomplish: etched feature formation in magnetic layers and maintaining the original imprinted pattern while increasing recording duty cycle.

With reference to FIG. 6, one alternative configuration may consist of: station 1-3 may be combined into one single station of the CCP source running under RF biased CF4 chemical etch condition; stations 4, 6, 8, 9 may be individual CCP sources running under RF Biased Ar sputter etch condition; stations 11 and 13 may be individual CCP source running under RF biased O2 conditions for post-mag etch and carbon hard mask removal.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive.

Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. Various aspects and/or components of the described embodiments may be used singly or in any combination in the plasma chamber arts. It is intended that the specification and examples be considered as exemplary only, with a true scope and spirit of the invention being indicated by the following claims.

The invention claimed is:

1. A method for patterning a hard disk in a system having successive processing chambers in vacuum environment where each processing chamber is isolated by an isolation valve, the hard disk having a magnetic stack formed over a substrate, a layer of hard mask formed over the magnetic stack, and a layer of patterned photoresist formed over the layer of hard mask, wherein the photoresist is patterned to define individual islands having a first duty cycle, the method comprising:
  loading the hard disk onto a disk carrier and transporting the disk carrier in a vacuum environment and into a reactive etch chamber;
  processing the hard disk in the reactive etch chamber by striking plasma of reactive gas so as to transfer an increased duty cycle pattern from the patterned photoresist onto the layer of hard mask by adjusting conditions of the reactive etch chamber to etch the hard mask to define individual islands having a second duty cycle higher than the first duty cycle;
  opening the isolation valve of the reactive etch chamber and removing the disk carrier from the reactive etch chamber and transporting the disk carrier into a sputtering etch chamber;
  processing the hard disk in the sputtering etch chamber by striking plasma of inactive gas so as to transfer the pattern from patterned layer of the hard mask onto the layer of magnetic stack.

2. The method of claim 1, wherein striking plasma of reactive gas comprises striking plasma with fluorine-containing gas.

3. The method of claim 1, further comprising scumming the photoresist in a plasma chamber prior to the transfer of the pattern from the patterned photoresist onto the layer of hard mask.

4. The method of claim 1, wherein processing the hard disk in the sputtering etch chamber comprises striking plasma of inactive gas so as to transfer an increased duty cycle pattern from the patterned layer of hard mask onto the layer of magnetic stack, to thereby form individual islands of magnetic material having a third duty cycle higher than the second duty cycle.

5. The method of claim 1, wherein striking plasma of inactive gas comprises striking plasma with argon gas.

6. The method of claim 5, wherein striking plasma of inactive gas further comprises flowing a reactive gas selected from CF4 or a gas having the general formula $CH(x)F(4-x)$, wherein x is an integer between 0 and 3, inclusive.

7. The method of claim 1, further comprising removing any residual hard mask after the transfer of the pattern from the patterned layer of hard mask onto the layer of magnetic stack.

8. The method of claim 7, wherein removing any residual hard mask comprises striking plasma using active gas.

9. The method of claim 8, wherein striking plasma using active gas comprises striking plasma with a fluorine-containing gas.

10. The method of claim 9, wherein the fluorine containing gas comprises one of CF4, or a gas having the general formula $CH(x)F(4-x)$, wherein x is an integer between 0 and 3, inclusive.

11. The method of claim 8, further comprising depositing refill layer after the removing any residual hard mask.

12. The method of claim 11, further comprising performing etch-back after the depositing refill layer, wherein the depositing refill layer and etch back processes are performed in separate chambers with balanced process times.

13. A method for patterning a hard disk, the hard disk having a magnetic stack formed over a substrate, a layer of hard mask formed over the magnetic stack, and a layer of patterned photoresist formed over the layer of hard mask, wherein the photoresist is patterned to define individual islands having a first duty cycle, the method comprising:
  transferring the hard disk into a vacuum environment inside a fabrication system and, without removing the hard disk from the vacuum environment performing the steps:
  processing the hard disk in a first reactive etch chamber by striking plasma of active gas so as to transfer an increased duty cycle pattern from the patterned photoresist onto the layer of hard mask by adjusting the conditions of the first reactive etch chamber to etch the hard mask to define individual islands having a second duty cycle higher than the first duty cycle;
  transferring the hard disk into a first sputtering etch chamber; and
  processing the hard disk in the first sputtering etch chamber by striking plasma of inactive gas so as to transfer the pattern from the patterned layer of the hard mask onto the layer of magnetic stack and thereby form islands of magnetic material having a third duty cycle.

14. The method of claim 13, further comprising: prior to processing the hard disk in the first reactive etch chamber, transferring the hard disk into a descum chamber and performing descum process on the hard disk, and then transferring the hard disk into the first reactive etch chamber.

15. The method of claim 13, further comprising transferring the hard disk into a second reactive etch chamber for performing the transfer of the pattern from the patterned photoresist onto the layer of hard mask on a second side of the hard disk; and transferring the hard disk into a second sputtering etch chamber for performing the transfer of the pattern from the patterned layer of hard mask onto the layer of magnetic stack on the second side of the hard disk.

16. The method of claim 13, wherein processing the hard disk in the first reactive etch chamber is performed on one side of the disk at a time, and wherein the steps in the vacuum environment further comprise a step of cooling the disk.

17. The method of claim 13, wherein the third duty cycle is higher than the second duty cycle.

18. The method of claim 13, wherein striking plasma of active gas comprises striking plasma with a fluorine-containing gas.

19. The method of claim 18, wherein the fluorine containing gas comprises one of CF4, or a gas having the general formula $CH(x)F(4-x)$, wherein x is an integer between 0 and 3, inclusive.

20. The method of claim 18, wherein striking plasma of inactive gas comprises striking plasma with argon gas.

21. The method of claim 20, wherein striking plasma of inactive gas further comprises flowing a reactive gas selected from CF4 or a gas having the general formula CH(x)F(4−x), wherein x is an integer between 0 and 3, inclusive.

22. The method of claim 20, further comprising scumming the photoresist in a plasma chamber prior to the transfer of the pattern from the patterned photoresist onto the layer of hard mask.

23. The method of claim 22, further comprising removing any residual hard mask after the transfer of the pattern from the patterned layer of hard mask onto the layer of magnetic stack.

24. The method of claim 22, further comprising depositing a refill layer onto the patterned magnetic stack in a separate chamber with balanced process time.

25. The method of claim 24, further comprising performing etch-back after depositing the refill layer, wherein the depositing the refill layer and etch back processes are performed in separate chambers with balanced process times.

26. The method of claim 25, further comprising removing any residual hard mask in a separate chamber, prior to depositing the refill layer onto the patterned magnetic stack.

* * * * *